United States Patent
Mangold

[15] 3,636,889
[45] Jan. 25, 1972

[54] PALLET
[72] Inventor: Robert T. Mangold, Erie, Pa.
[73] Assignee: Nosco Plastics, Incorporated, Erie, Pa.
[22] Filed: May 19, 1970
[21] Appl. No.: 38,773

[52] U.S. Cl. ....................................................108/53
[51] Int. Cl. ...................................................B65d 19/18
[58] Field of Search ....................................108/51–58; 292/152, 153

[56] References Cited

UNITED STATES PATENTS 1,191,502  7/1916  Emme..................................292/152 X
2,650,122  8/1953  Welch..................................292/152 X
3,307,504  3/1967  Cloyd et al..............................108/58
3,363,590  1/1968  Cloyd et al..............................108/53

Primary Examiner—Bobby R. Gay
Assistant Examiner—Glenn O. Finch
Attorney—Ralph Hammar

[57] ABSTRACT

Stacked empty pallets having registering sockets in adjoining surfaces are interlocked by latch members carried by yieldable arms extending from the midsections of the sockets and yieldably projecting from the socket of one pallet into the corresponding socket of an adjoining pallet.

1 Claims, 3 Drawing Figures

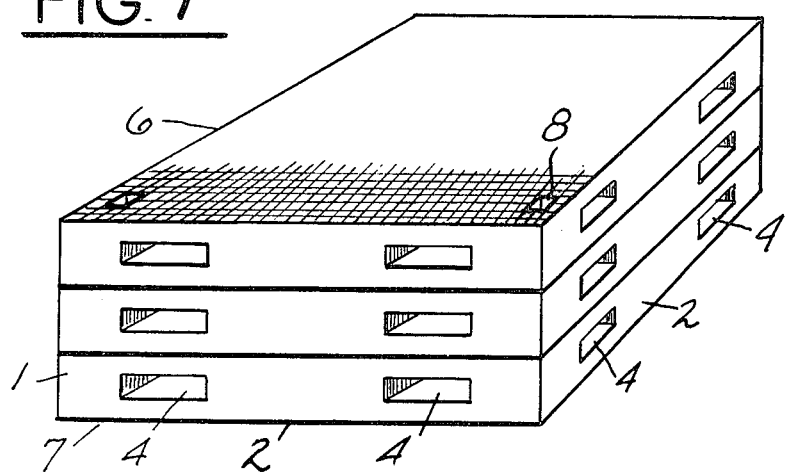
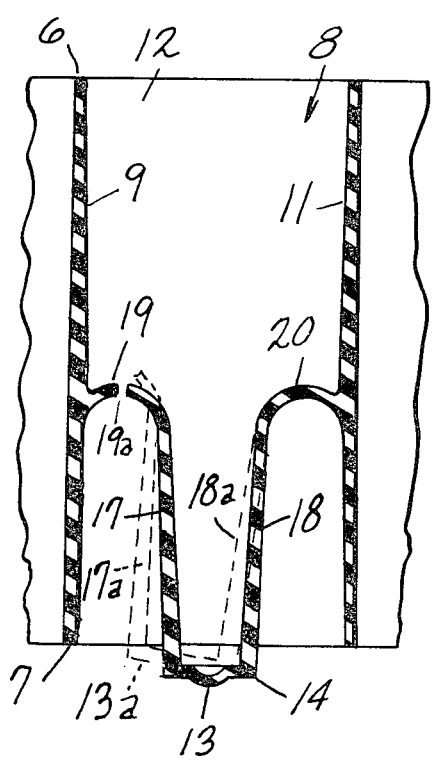
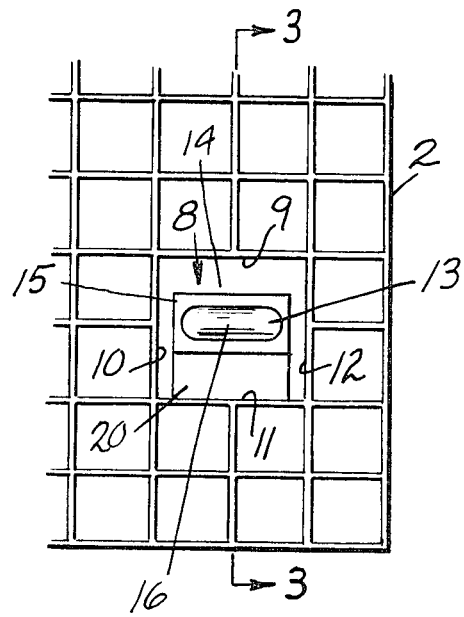

PALLET

This invention is an improvement on U.S. Pat. No. 3,363,590, simplifying the latch construction for interlocking empty pallets so as to hold them in stacked relation.

In the drawing,

FIG. 1 is a perspective of a stack of empty pallets,

FIG. 2 is a fragmentary bottom plan view of one of the pallets and

FIG. 3 is a section on line 3—3 of FIG. 2.

In FIG. 1 there is shown a stack of a plurality of pallets 1 of generally rectangular shape having peripheral side and end walls 2 each provided with a pair of fork entry openings 4 to provide the usual four-way entry. Each pallet has upper and lower load carrying surfaces 6 and 7. The particular pallet shown is constructed in accordance with U.S. Pat. No. 3,307,504, incorporated by reference. As described in greater detail in that patent, the load carrying surfaces 6 and 7 of each pallet is associated with the lattice of intersecting ribs presented edgewise to the surfaces and providing a rigid construction which is adapted to molding from impact resistant plastic such as polyethylene. This is merely one of the pallets to which the present invention is applicable.

In order to hold the empty pallets in stacked relation as shown in FIG. 1, at several (e.g., four) points around the periphery of the pallet there are provided sockets 8 which extend between the surfaces 6, 7. As shown in FIGs. 1 and 2, the sockets are spaced inward from the outer walls 2 of the pallet. Each socket comprises walls 9, 10, 11 and 12, each extending in the thickness direction between the surfaces 6, 7 and each integral with the adjoining sections of the pallet.

At the center of one end of each of the sockets 8 is a latch member 13 supported by one of the walls of the socket, for example the wall 11. The latch member has rectangular sides 14 and ends 15 at the center of which is a rounded projection 16. When the pallets are stacked one on top of the other, the latches 13 enter the sockets 8 in the adjoining pallet. The rectangular sides 14, 15 provide abrupt shoulders for holding the pallets in alignment. The rounded projection 16 acts as a cam surface which allows the pallets to slide into position as they are stacked. Once the latches have entered the sockets 8, the stack of pallets is interlocked by the latches so that they will remain in stacked relation.

The manner of making the latch members 13 is shown in FIG. 3. As molded, the latch member 13 is integral with the lower ends of arms 17, 18 of width substantially equal to the length of the latch. When viewed in section, the arms 17, 18 and the associated latch 13 extend generally in the thickness direction and form a U with the latch at the base of the U and with the arms offset laterally from the walls of the socket. The arm 18 is joined to the socket wall 11 by a curved section 20. There is a similar curved section 19 at the upper end of the arm 17 which has a cut or interruption 19a so that after removal from the mold the latch member 13 and the arms 17, 18 assume the position generally indicated by dotted lines 13a, 17a and 18a. The arm 18 with the associated section 20 forms a yieldable support for the latch member 13 which permits the latch member 13 to be moved laterally and in and out of the socket so as to prevent damage to the latch members while the pallets are being used. For example, when the pallet is supported by its lower surface 7, the latch members 13 are free to retract within the socket. While the pallets are being stacked, the latch members 13 are free to move either laterally or inwardly. When the latch members 13 come into alignment with a socket 8 in an adjoining pallet, the latch members spring into engagement with the adjoining socket and provide a mechanical interlock which holds the pallets in stacked relation but which yields to permit removal from the stack without injury to the latch members or the associated parts of the pallet.

The arms 17, 18 and the section 20 are substantially wholly within the sockets 8 and are well protected. The latch construction is adapted to molded plastic pallets. The integral construction provides reliability at minimal cost.

The reference to upper and lower load carrying surfaces of the pallet refers to the position of the surfaces in the particular stack. The stack could be inverted without changing the operation. The terms upper and lower are, accordingly, interchangeable and not words of limitation.

I claim:

1. In a molded plastic pallet having vertically spaced load carrying surfaces and means providing sockets extending in the thickness direction between said surfaces with open ends presented to said surfaces and registering with the open ends of sockets of adjoining pallets in a stack of pallets of like construction, said sockets having plastic walls extending in the thickness direction inward from said surfaces, yieldable plastic arms each extending generally in the thickness direction and having one end molded integral with one of said walls inward of one of said surfaces and the other end carrying a latch member outward of said one of said surfaces in position to enter the open end of a socket of an adjoining pallet of like construction, said arm yielding to permit retraction of the latch member into the associated socket.

* * * * *